United States Patent
Weicherding

(10) Patent No.: US 11,034,050 B2
(45) Date of Patent: Jun. 15, 2021

(54) DEVICE FOR REDUCING THE SIZE OF FEED MATERIAL AND METHOD FOR OPERATING A SIZE REDUCTION DEVICE OF THIS TYPE

(71) Applicant: PALLMANN MASCHINENFABRIK GmbH & Co. KG, Zweibruecken (DE)

(72) Inventor: Hans-Georg Weicherding, Hermeskeil (DE)

(73) Assignee: PALLMANN MASCHINENFABRIK GmbH & Co. KG, Zweibruecken (DE)

( * ) Notice: Subject to any disclaimer, the term of this patent is extended or adjusted under 35 U.S.C. 154(b) by 193 days.

(21) Appl. No.: 15/986,015

(22) Filed: May 22, 2018

(65) Prior Publication Data

US 2018/0333890 A1   Nov. 22, 2018

(30) Foreign Application Priority Data

May 22, 2017   (DE) ..................... 10 2017 111 071.2

(51) Int. Cl.
  *B27L 11/02*   (2006.01)
  *B27L 11/00*   (2006.01)
  *B23Q 7/02*   (2006.01)

(52) U.S. Cl.
  CPC .............. *B27L 11/005* (2013.01); *B23Q 7/02* (2013.01); *B27L 11/02* (2013.01)

(58) Field of Classification Search
  CPC ........ B27L 11/00; B27L 11/005; B27L 11/02; B27L 11/04; B27L 11/08; B23Q 7/02; B02C 25/00
  See application file for complete search history.

(56) References Cited

U.S. PATENT DOCUMENTS

| | | | | |
|---|---|---|---|---|
| 6,142,046 A | * | 11/2000 | Mierau | B26D 5/00 125/13.02 |
| 6,726,135 B2 | * | 4/2004 | Pallmann | B27L 11/02 241/299 |
| 6,730,007 B2 | * | 5/2004 | Pallmann | B23Q 3/1556 29/426.1 |
| 6,743,160 B2 | | 6/2004 | Pallmann | |

(Continued)

FOREIGN PATENT DOCUMENTS

DE       10125923 A1   10/2002
DE   102004004877 A1    8/2005
(Continued)

*Primary Examiner* — Matthew Katcoff
(74) *Attorney, Agent, or Firm* — Muncy, Geissler, Olds & Lowe, P.C.

(57) ABSTRACT

A device and method for reducing a size of feed material. The device has a knife ring that is stationary within a housing or rotates around an axis. The knife ring has rod-shaped knife carriers that are disposed concentrically around the axis in an axis-parallel position at a mutual circumferential distance from each other and that form an inner circumferential surface of the knife ring with their sides facing the axis. Each knife carrier having a receptacle for fastening a flaking knife. The flaking knife protruding by its edge between two knife carriers into the flaking chamber. A measuring instrument includes at least one distance sensor that measures a distance of the inner circumferential surface and/or the edges of the flaking knives from the at least one distance sensor.

15 Claims, 2 Drawing Sheets

(56) References Cited

U.S. PATENT DOCUMENTS

| | | |
|---|---|---|
| 6,755,772 B2 | 6/2004 | Pallmann |
| 6,767,315 B2 | 7/2004 | Pallmann |
| 7,377,298 B2 * | 5/2008 | Pallmann .............. B27L 11/005 144/172 |
| 10,065,338 B2 | 9/2018 | Degel et al. |

FOREIGN PATENT DOCUMENTS

| | | |
|---|---|---|
| DE | 102014116972 A1 | 5/2016 |
| EP | 1008427 A1 | 6/2000 |

* cited by examiner

DEVICE FOR REDUCING THE SIZE OF FEED MATERIAL AND METHOD FOR OPERATING A SIZE REDUCTION DEVICE OF THIS TYPE

This nonprovisional application claims priority under 35 U.S.C. § 119(a) to German Patent Application No. DE 10 2017 111 071.2, which was filed in Germany on May 22, 2017, and which is herein incorporated by reference.

BACKGROUND OF THE INVENTION

Field of the Invention

The present invention relates to a device for reducing the size of feed material according and a method for operating a size reduction device.

Description of the Background Art

Size reduction devices of this type are known, for example, as knife ring flakers which include an inner impeller system, in which the wood chips are cut into fine flakes and used as a source material for manufacturing particle board. Long log flakers are also known, in which the stationary feed material is transformed into large-format flakes by a rotating and transversely moving knife ring, the flakes being further used to manufacture OSB products.

Knife ring flakers have a knife ring which is freely rotatable around an axis as the size reduction unit and which essentially comprises two concentric carrier disks, which are connected to each other via knife carriers disposed in the shape of a crown. The inner circumferential surface of the knife ring is thus formed by the undersides of the knife carriers and simultaneously represents the delimiting surface for the flaking chamber. Due to the high mechanical stresses, this surface is generally provided with a wear-resistant design.

The individual knife carriers are disposed one below the other at a predetermined circumferential distance, so that longitudinal gaps are formed over the axial extension of the inner circumferential surface. In this area, the knife carriers have recesses for receiving knife assemblies. Each knife assembly comprises a flaking knife and a knife holding plate, which are adjustable via elongated holes and screws and are detachably connected to each other. In the installed state, the flaking knives of the knife assemblies extend into the flaking chamber through the released longitudinal gap between the knife carriers with a predetermined edge protrusion over the inner circumferential surface. In this manner, the circumferential surface of the knife ring, together with the edges of the flaking knives, forms the flaking path of a knife ring flaker.

The geometry of the underlying flake has an essential influence on the quality and the properties of the end product manufactured from the flakes. To ensure constant material properties of the end product, it is necessary to produce flakes of uniform dimensions and surface condition within narrow tolerances. An essential influencing variable is the radial edge protrusion over the inner circumferential surface into the flaking chamber, which determines the flake thickness. The goal is to arrange all edges of a knife ring on a shared edge circular path having an identical edge protrusion.

A knife ring flaker is subject to natural wear during its operation. In particular, the flaking knives and the inner circumferential surface of the knife ring are affected thereby. Due to different material properties, arrangement and function in the flaking chamber, as well as the duration of use, the aforementioned parts have a different rate of wear. As the wear increases, the flake geometries change, and as a consequence the flake quality suffers.

To compensate for the wear, the use of disposable knives and replaceable wear shoes on the inner circumferential surface are known, which are not resharpened or ground upon reaching a certain degree of wear but are replaced with new ones. It is assumed that the new parts result in the predetermined edge protrusion virtually without any additional action when installed in a knife ring. Due to the lack of adjusting possibilities, however, manufacturing tolerances are not taken into account, so that even initial deviations in the edge protrusion must be accepted, to which wear-induced deviations are added, along with the resulting disadvantages in flake quality. Economic disadvantages arise due to the need to frequently replace the flaking knives and wear shoes.

In contrast, solutions have proven to be successful, in which each knife carrier has a permanently defined stop for adjusting the edge protrusion, which specifies the so-called zero position of the knife assembly. The zero positions of all knife carriers of a knife ring represent reference surfaces for installing the knife assemblies, all of which have the same radial distance from the rotation axis of the knife ring. Based on these reference surfaces, it is possible to uniformly set the necessary edge protrusion for the entire knife ring, taking the state of wear into account. The advantage is the possibility of being able to set both new and previously used flaking knifes to the exact edge protrusion, taking into account the state of wear of the inner circumferential surface of the knife ring, so that an optimum flake quality is ensured.

SUMMARY OF THE INVENTION

It is therefore an object of the present invention to further develop known devices and methods with respect to the chip quality achievable therewith.

The approach pursued with the invention to improve the flake quality is based on an exact and complete detection and evaluation of the actual geometry of the inner circumferential surface, including protruding flaking knifes, which form the flaking path. The contour of the inner circumferential surface, including the position of the flaking knives, is recorded and evaluated with the aid of a measuring instrument. In this way, it is possible, after the knife ring has come to a stop, to detect the installation position of new or resharpened flaking knives and compare it to the necessary setpoint position, for example after an interruption in the flaking operation or after changing knives. If the determined deviations exceed the tolerances, a differentiated determination of which knife carriers and/or flaking knives are affected may be made via the inner circumferential surface, which, in turn, makes it possible to selectively remedy the situation.

The measurements are preferably carried out in the end areas of the knife carriers and/or flaking knives, since the specific location of a flaking knife may be detected with sufficient accuracy with the aid of two measuring points spaced a distance apart. Due to another distance measurement, approximately in the center between the end measuring points, deviations of the edges of the flaking knives from a linear course may also be determined.

Optical or acoustic sensors are preferably used as distance sensors, whose data is characterized by a high accuracy at high resolution and permits direct further processing.

According to the invention, it is possible to permanently install the measuring instrument in a size reduction device, with the advantage that measurements may be carried out at any time and without great assembly complexity.

Alternatively, the invention also comprises specific embodiments, in which the measuring instrument is only temporarily installed in a size reduction device for the measurement operation. In this variant, it is sufficient to keep only one measuring instrument on hand, which may then be used in multiple size reduction devices. Fasteners, which simultaneously cause a centering of the measuring instrument in the setpoint position during fastening, may also be provided to quickly mount the measuring instrument in the correct position with respect to the knife ring. Moreover, the measuring instrument is not subjected to the size reduction operation when installed temporarily and therefore does not have to be designed for this load. Mobile measuring instruments of this type may also be used in existing devices without problems, without requiring significant changes to be made to the devices.

To obtain preferably accurate measurement results, a short distance between the distance sensors and the flaking path is preferred. In this sense, the invention proposes a distance between the distance sensor and the flaking path of a maximum of 10 mm, preferably a maximum of 5 mm.

To increase the measurement accuracy, a particularly advantageous refinement of the invention furthermore provides that the measuring direction of a distance sensor is in a vertical plane with respect to the rotation axis of the knife ring and is preferably radially oriented.

The data obtained with the aid of the measuring instrument preferably flows into the assembly of knife assemblies for the next knife change. The flake geometries may thus be optimized from one knife change to another. Another use of the measured data, for example for documentation for the purpose of quality management and/or for optimizing the machine and product properties and/or for planning and carrying out maintenance and repair work, opens up many different possibilities for monitoring and controlling an efficient and high quality size reduction operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
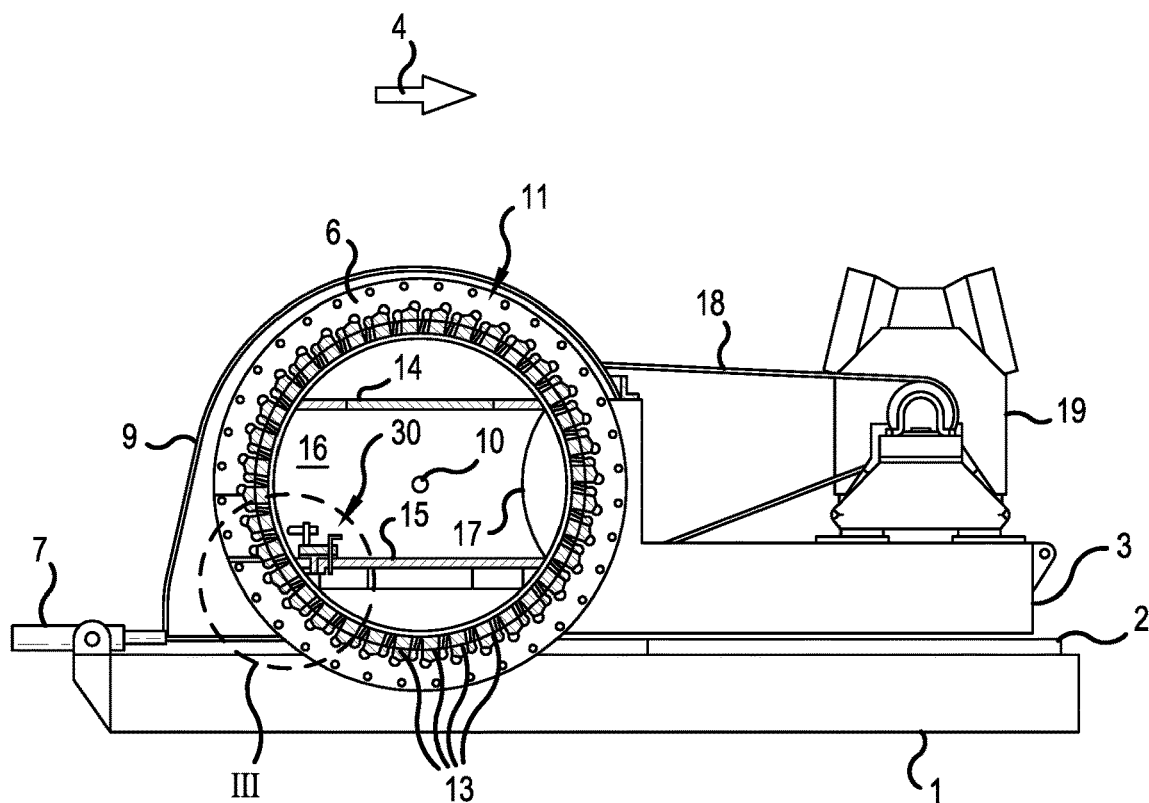
FIG. 1 shows a side view of a wood log flaker according to the invention.
Figure 2:
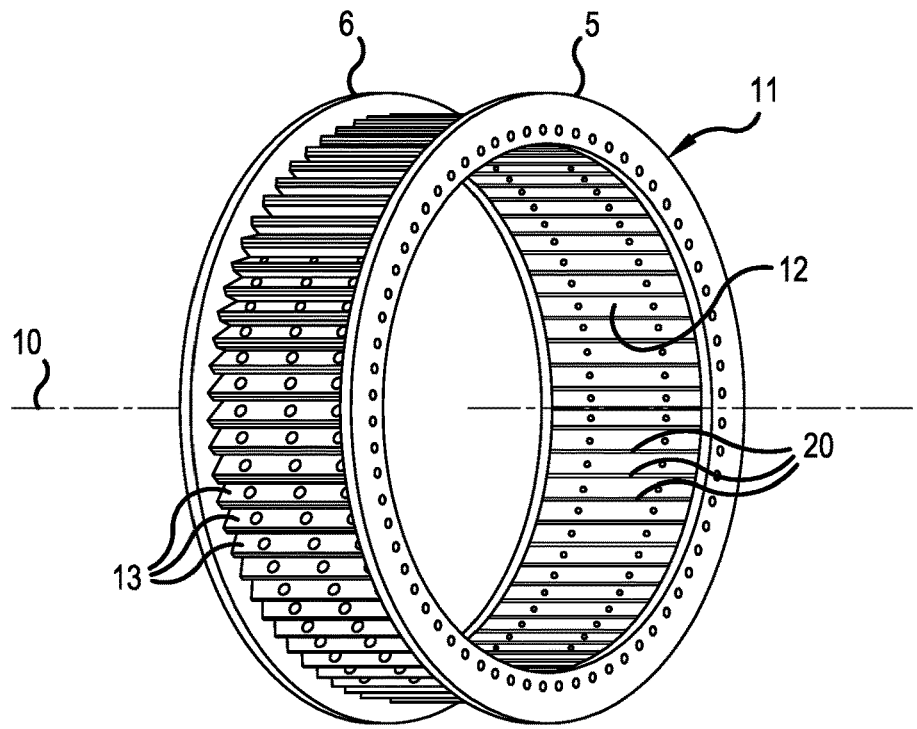
FIG. 2 shows am oblique view of the knife ring of the wood log flaker illustrated in FIG. 1.

A knife ring flaker according to the invention, in the form of a long log flaker, is illustrated in FIG. 1. Likewise, a wood chipper comprising a stationary or rotating knife ring and inner impeller would also be suitable for clarifying the invention. The knife ring flaker includes a substructure 1, which is connected to the foundation. Slide rails 2, which run horizontally in the representation plane, are disposed on the upper side of substructure 1 and are used for a carriage 3 situated thereover as the path for a sideways movement 4. For this purpose, carriage 3 has wheels on its underside, which roll on slide rails 2, as well as a cylinder piston unit 7, which is hinged to substructure 1 and which provides sideways movement 4 of carriage 3 with the aid of its movable piston. A knife ring 11 is rotatably supported around a horizontal axis 10 running transversely to slide rails 2 on carriage 3 within a housing 9, which surrounds a disk-shaped space.

As is further illustrated in FIG. 1, the annular disk-shaped space has an apex segment 14 in the upper area and a base element 15 in the lower area, which delimit a flaking chamber 16 by means of their surfaces facing axis 10. Apex segment 14 and base segment 15 are stationary with respect to carriage 3, and thus move sideways together with carriage 3. A counter-support 17 having a cross-sectional convex design protrudes into flaking chamber 16, which is open on the front end, and is disposed in a stationary manner with respect to substructure 1 or the foundation and thus does not follow sideways movement 4 of carriage 3.

A drive unit 19, which induces the rotation of knife ring 11, is disposed to the side of knife ring 11 on carriage 3. Drive unit 19 is connected via a belt 18 to the multi-groove disk, which is not illustrated and is rigidly connected to knife ring 11 disposed on the rear end of axis 10 via a shaft.

The more precise structure of knife ring 11 is apparent, in particular, from a combined view of FIGS. 2 through 5. It is apparent that knife ring 11 includes a carrier ring 5 disposed coaxially to axis 10 and a carrier disk 6 disposed plane-parallel thereto at an axial distance. Carrier ring 5 and carrier disk 6 are connected on their facing insides via a large number of axis-parallel knife carriers 13 distributed evenly over the circumference, which results in a stiff knife ring 11 having a fixed geometry.

The sides of all knife carriers 13 facing axis 10 form inner circumferential surface 12 of knife ring 11, individual knife carriers 13 being disposed at a mutual distance from each other, whereby inner circumferential surface 12 has an axially running gap 20 between individual knife carriers 13.

Figure 3:
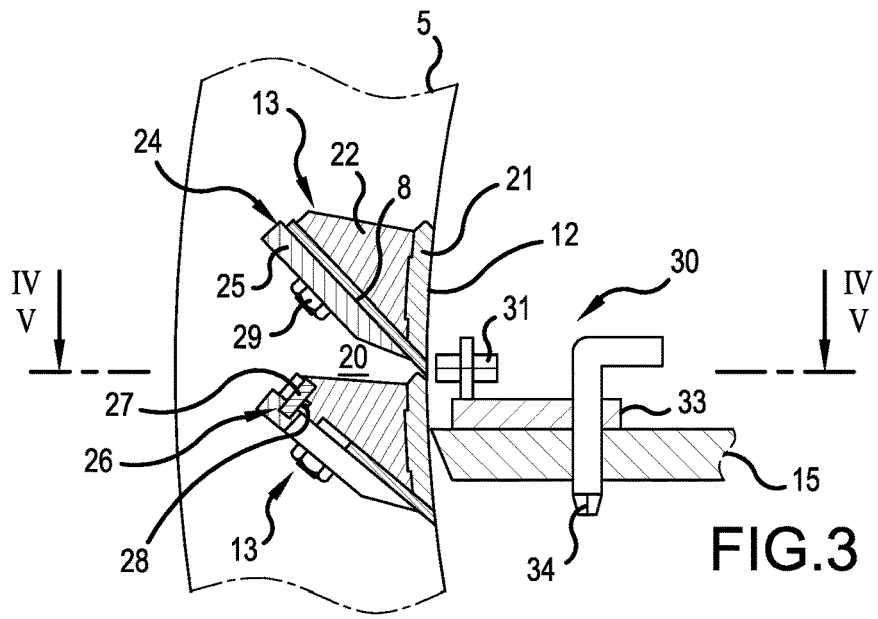
FIG. 3 shows a detail of the area designated by III in FIG. 1 of the wood log flaker according to the invention.

The more precise arrangement of knife carriers 13 with respect to each other and in reference to carrier ring 5 or carrier disk 6, and the more specific structure of knife carriers 13 are apparent, in particular, from FIG. 3, which shows a sectional view of a circumferential section of a knife ring 11 according to the invention. Reference numeral 5, in turn, designates the carrier ring, from whose inside knife carriers 13 protrude perpendicularly. Each knife carrier 13 essentially comprises a base carrier 22, which is provided with a wear-resistant design on its underside facing flaking chamber 16, which, in the present exemplary embodiment, is implemented by the arrangement of a plate-shaped wear shoe 21 in that location.

Each knife carrier 13 has a bearing surface 23 which opens obliquely into gap 20, on its front side in the circumferential direction, and which is provided for receiving a knife assembly 24. Each knife assembly 24 is formed by a knife holding plate 25, on which flaking knife 8 is fastened within elongated holes, as is generally known. For this purpose, knife assemblies 24 are set to a predetermined edge protrusion in a gauge provided for this purpose outside the knife ring flaker and kept on hand for the next knife change.

An adjusting mechanism 26, comprising a stop bar 27, which is screwed to base carrier 22 with multiple spacing washers 28 connected therebetween, is provided on the rim of base carrier 22 facing away from gap 20. Stop bar 27 is used as a fixed reference surface, which defines the so-called zero position, from which the edge protrusion of flaking knives 8 is set. The zero position is adjusted by arranging a suitable number of spacing washers 28 between stop bar 27 and base carrier 22.

During the positioning of a knife assembly 24 on bearing surface 23, knife assembly 24 abuts stop bar 27 by its back rim, so that upon the precise mounting of flaking knife 8 on knife holding plate 25, the predetermined edge protrusion results without any additional action. Knife assembly 24 is fastened on bearing surface 23 with the aid of screws 29.

The feed material, for example long wood, protrudes axially into flaking chamber 16 with the free part of its length, as does counter-support 17. The part of the feed material situated outside flaking chamber 12 is fixedly clamped in a feed device for the flaking process, which is not illustrated. In addition, hold-down units, which are not illustrated, are present in flaking chamber 12, which hold the feed material in flaking chamber 12 during the flaking process.

The feed material is reduced in size by the transverse movement of carriage 3 during the rotation of knife ring 11, the feed material being pressed against inner circumferential surface 12, due to stationary counter-support 17, where it is brought into engagement with protruding flaking knives 8. The flakes produced pass radially through gap 20 into the outer circumferential area of knife ring 11, where they are fed to the material outlet.

Due to the rapid wear on the edges of flaking knifes 8, it is necessary to replace knife assemblies 24 with assemblies having resharpened flaking knives 8 after operating the device for multiple hours, it being necessary for the edges of new flaking knives 8 to be situated on a precise circular path with respect to axis 10 with a uniform edge protrusion.

To monitor these parameters, the device according to the invention includes a measuring instrument 30, which may be temporarily or permanently installed in flaking chamber 16. Measuring instrument 30 detects the distance of inner circumferential surface 12 and the edges of flaking knives 8 with respect to a reference point in a vertical plane to axis 10 and, after processing of the measured data, reproduces the actual contour of inner circumferential surface 12 with flaking knives 8.

Figure 4:
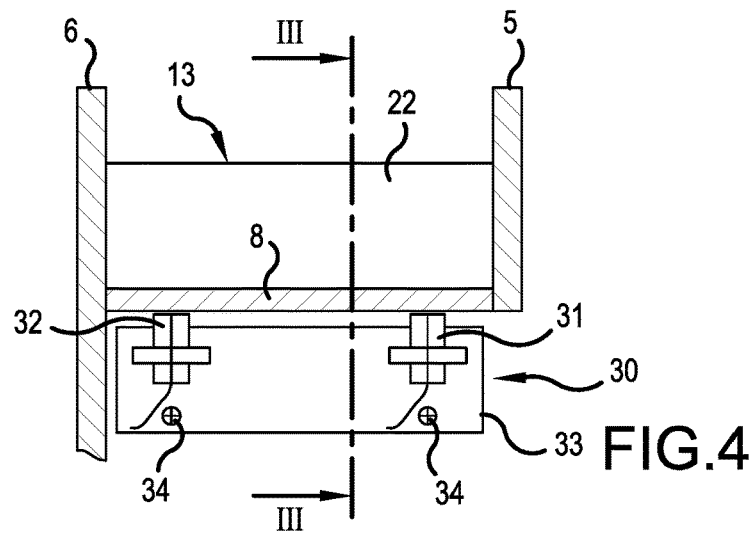
FIG. 4 shows a section of the area illustrated in FIG. 3 along the line IV-IV therein.

The exemplary embodiment according to FIGS. 3 and 4 shows a measuring device 30, which is provided for temporary arrangement in flaking chamber 16, for example after a knife change has taken place or upon inspection of a knife ring 11. In the case of a permanent installation, it is suitable to fasten the measuring instrument in the area of apex segment 14, base element 1 or counter-support 17.

Measuring instrument 30 according to the invention comprises a first distance sensor 31 and a second distance sensor 32, which are situated opposite inner circumferential surface 12 at a close diametrically radial distance and, in each case, detect the distance between themselves and inner circumferential surface 12 or a flaking knife 8 in a vertical plane to axis 10 and transmit it to a data processing unit, which is not illustrated in greater detail.

Both distance sensors 31 and 32 are disposed on a shared mounting plate 33, whose length approximately corresponds to that of knife carrier 13. Mounting plate 33 is inserted axially into flaking chamber 16 to install measuring instrument 30 and is fastened on base element 15 in the rim area with respect to knife ring 11 in an axis-parallel position with respect to axis 10 with the aid of centering an locking bolts 34. First distance sensor 31 occupies a position adjacent to carrier ring 5, and second distance sensor 32 occupies a position adjacent to carrier disk 6, so that the measurement areas detected by the two distance sensors 31 and 32 are located primarily in the end areas of knife carriers 13 or flaking knives 8.

To detect the contour of inner circumferential surface 12 and the protrusion of the edges of flaking knives 8, distance sensors 31 and 32 continuously carry out distance measurements during the rotation of knife ring 11 by 360°, for example during the reference run of a knife ring 11 after a knife change. By comparing the ascertained distances with the tolerances, tolerance overruns may be determined and assigned to individual knife carriers 13 or flaking knives 8.

The data records created during each measurement operation may be archived for documentation for the purpose of quality management and/or used as a basis for optimizing the product properties and/or taken into account during the mounting of the knife assemblies at a predetermined edge protrusion and/or form the basis for planning and carrying out maintenance and repair work and/or represented graphically as a curve to facilitate evaluation.

Figure 5:
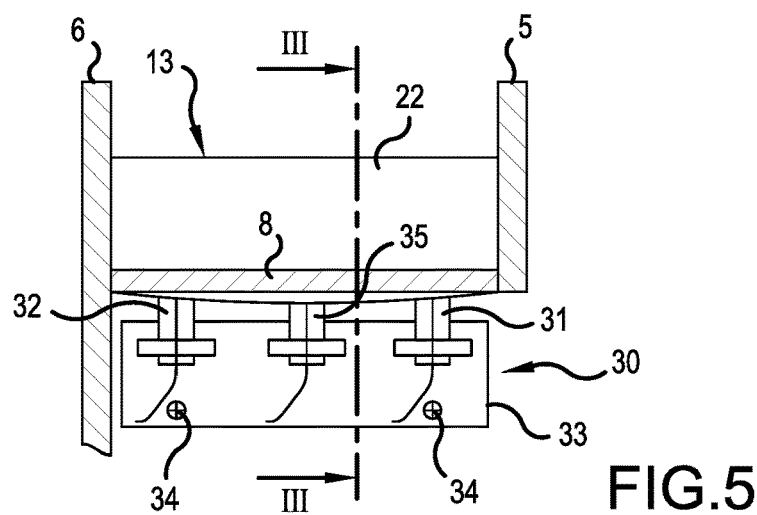
FIG. 5 shows a section according to FIG. 4, having a measuring instrument comprising three distance sensors.

As shown in FIG. 5, measuring instrument 30 may additionally comprise a third distance sensor 35, which is disposed centrally between first and second distance sensors 31, 32 on mounting plate 33 and which records the contour of inner circumferential surface 12 centrally between carrier ring 5 and carrier disk 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for reducing a size of feed material, the device comprising:

a knife ring that that rotates around an axis within a housing, the knife ring having rod-shaped knife carriers that are disposed concentrically around the axis in an axis-parallel position at a mutual circumferential distance from each other and that form an inner circumferential surface of the knife ring with their sides facing the axis, the knife carriers of the knife ring each having a flaking knife and a receptacle for fastening the flaking knife, and an edge of each flaking knife protruding between two of the knife carriers into a flaking chamber;

a measuring instrument that includes at least one distance sensor that, for an exact and complete detection of an entire contour of the inner circumferential surface of the knife ring including the protruding of the edge of each flaking knife, measures a distance of the inner circumferential surface and the edges of the flaking knives from the at least one distance sensor; and a data processing unit that receives measured data from the measuring instrument and is configured to reproduce and evaluate the entire contour of the inner circumferential surface of the knife ring including the protruding of the edge of each flaking knife.

2. The device according to claim 1, wherein the measuring instrument measures the distance at least in end areas of the knife carriers, end areas of the flaking knives and in a center of the knife carriers and the flaking knives.

3. The device according to claim 1, wherein the at least one distance sensor is formed by an optical sensor or acoustic sensor, and the measuring instrument ascertains the distance by measuring a propagation time of light or sound waves.

4. The device according to claim 1, wherein the at least one distance sensor is disposed in a stationary manner on the housing or in a stationary manner on stationary parts of the device in the flaking chamber.

5. The device according to claim 1, wherein the at least one distance sensor is disposed on a fixture that is detachably fastened on the device.

6. The device according to claim 5, wherein the fixture is formed by a mounting plate that protrudes in an axis-parallel position into the flaking chamber.

7. The device according to claim 5, wherein the fixture is detachably fastened on the device in a relative position with respect to the knife ring with the aid of a centering and locking device.

8. The device according to claim 1, wherein the distance between the at least one distance sensor and the inner circumferential surface or the flaking knives is a maximum of 10 mm or a maximum of 5 mm.

9. The device according to claim 1, wherein a measuring direction of the at least one distance sensor is in a vertical plane to the axis and is radially oriented.

10. The device according to claim 1, wherein the flaking knives are settable to a predetermined edge protrusion, and wherein measured data of the measuring instrument forms a basis for setting the predetermined edge protrusion.

11. A method for operating a feed material size reduction device, the method comprising:
providing a knife ring that rotates around an axis of a housing, the knife ring having flaking knives;
detecting, reproducing and evaluating an entire contour of an inner circumferential surface of the knife ring including protrusion of edges of the flaking knives in at least one vertical plane to the axis by using a measuring instrument having at least one distance sensor, the measuring instrument obtaining measured data by measuring a distance of the inner circumferential surface and the edges of the flaking knives from the at least one distance sensor.

12. The method according to claim 11, wherein the measured data is transmitted to a station for mounting knife assemblies of the flaking knives, and a setting of a predetermined edge protrusion of the flaking knives takes place as a function of the measured data during the mounting of the knife assemblies.

13. The device according to claim 1, wherein the knife ring circumferentially surrounds an annular space that is delimited by an upper apex segment and a lower base segment, the apex segment and the base segment being stationary with respect to the housing while the knife ring rotates, the flaking chamber being disposed between an inner surface of the apex segment and an inner surface of the base segment, the inner surface of the apex segment facing the inner surface of the base segment, and
wherein the measuring instrument is mounted inside of the flaking chamber.

14. The method according to claim 11, wherein the measuring instrument is mounted inside a flaking chamber of the device; and
wherein the knife ring circumferentially surrounds an annular space that is delimited by an upper apex segment and a lower base segment, the apex segment and the base segment being stationary with respect to the housing while the knife ring rotates and wherein the flaking chamber, inside of which the measuring instrument is mounted, is disposed between an inner surface of the apex segment and an inner surface of the base segment, the inner surface of the apex segment facing the inner surface of the base segment.

15. The device according to claim 13, wherein the at least one distance sensor is disposed on a mounting plate, the mounting plate being bolted to either the apex segment or the base segment using at least one removable bolt.

* * * * *